(12) United States Patent
Nilsson (10) Patent No.: US 10,009,082 B2
(45) Date of Patent: Jun. 26, 2018

(54) ACTIVE ANTENNA ARRANGEMENT FOR TRANSMITTING PRECODED SIGNALS IN A COMMUNICATION SYSTEM, BASE STATION, METHODS AND COMPUTER PROGRAMS

(75) Inventor: Andreas Nilsson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1379 days.

(21) Appl. No.: 13/980,299

(22) PCT Filed: Jan. 17, 2011

(86) PCT No.: PCT/EP2011/050531
§ 371 (c)(1),
(2), (4) Date: Jul. 17, 2013

(87) PCT Pub. No.: WO2012/097862
PCT Pub. Date: Jul. 26, 2012

(65) Prior Publication Data
US 2013/0308722 A1  Nov. 21, 2013

(51) Int. Cl.
*H01Q 3/28* (2006.01)
*H04B 7/06* (2006.01)
(Continued)

(52) U.S. Cl.
CPC .............. *H04B 7/0617* (2013.01); *H01Q 3/28* (2013.01); *H01Q 21/0006* (2013.01); *H01Q 21/293* (2013.01); *H01Q 23/00* (2013.01)

(58) Field of Classification Search
CPC .... H01Q 3/28; H01Q 21/0006; H01Q 21/293; H01Q 23/00
See application file for complete search history.

(56) References Cited

U.S. PATENT DOCUMENTS 6,362,780 B1    3/2002  Butz et al.
6,661,374 B2 *  12/2003  Kim .................... H01Q 3/24
                                          342/368
(Continued)

FOREIGN PATENT DOCUMENTS

EP    1 215 750 A2    6/2002

OTHER PUBLICATIONS

Notification of Transmittal of International Preliminary Report on Patentability, in corresponding International Application No. PCT/EP2011/050531, dated Nov. 11, 2013, 21 pages.
(Continued)

*Primary Examiner* — Hoang Nguyen
(74) *Attorney, Agent, or Firm* — Rothwell, Figg, Ernst & Manbeck, P.C.

(57) ABSTRACT

The invention relates to an active antenna arrangement for transmitting precoded signals in a communication system supporting multi-stream beam-forming. The active antenna arrangement comprises: three or more active antenna devices each comprising an antenna element and a power amplifier; at least a first and a second splitter, each arranged to split a respective one of the precoded signals into two or more split precoded signals; and at least one combiner arranged to: receive one of the two or more split precoded signals from the first splitter, and one of the two or more split precoded signals from the second splitter, and combine the received split precoded signals for transmission by a single one of the active antenna devices. The invention also relates to a base station, methods and computer programs.

9 Claims, 5 Drawing Sheets

(51) Int. Cl.
*H01Q 21/00* (2006.01)
*H01Q 21/29* (2006.01)
*H01Q 23/00* (2006.01)

(56) References Cited

U.S. PATENT DOCUMENTS

| | | | | |
|---|---|---|---|---|
| 6,842,629 B1 * | 1/2005 | Granstam | ................ | H04B 1/52 375/211 |
| 2002/0166124 A1 * | 11/2002 | Gurantz | .............. | H04L 12/2801 725/78 |

OTHER PUBLICATIONS

Examination Report, in corresponding Singapore Application No. 2013047345, dated Jun. 4, 2015, 11 pages.

* cited by examiner

ACTIVE ANTENNA ARRANGEMENT FOR TRANSMITTING PRECODED SIGNALS IN A COMMUNICATION SYSTEM, BASE STATION, METHODS AND COMPUTER PROGRAMS

CROSS REFERENCE TO RELATED APPLICATION (S)

This application is a 35 U.S.C. § 371 National Phase Entry Application from PCT/EP2011/050531, filed Jan. 17, 2011, designating the United States, the disclosure of which is incorporated herein in its entirety by reference.

FIELD OF THE INVENTION

The invention relates to active antenna arrangements, base station, methods and computer programs for transmitting precoded signals in a communication system.

BACKGROUND OF THE INVENTION

Pre-coding is a kind of beam-forming that supports multi-layer transmission in MIMO radio systems. It has been shown that pre-coding increases the performance of wireless communication systems and has therefore been included in the standardization of 3GPP Long Term Evolution (LTE).

In pre-coding, each of a multiple of data streams are emitted from transmit antennas at a base station with independent and appropriate weighting per each antenna such that data throughput is maximized between the base station and user equipment. Pre-coding weights are calculated at the user equipment, which then informs the base station about which pre-coding weights are to be used. Usually, only a limited number of predefined pre-coding weights are used, called a codebook. The codebook is known by both the base station and the user equipment, so when the user equipment informs the base station about which set of pre-coding weights to use, the user equipment only needs to send a number corresponding to an index that the pre-coding weights have in the codebook. This number is usually called Pre-coding Matrix Indicator (PMI).

Studies have shown that a beam width of an antenna element pattern of a three-sector base station antenna should be about 65 degrees in order to optimize performance of a communication system. However, in case multiple antennas spaced one-half wavelength $\lambda/2$ apart are used at the base station, it is difficult to obtain antenna element patterns with beam widths as small as 65 degrees. Generally, the antenna element pattern will be around 90 degrees when the antenna separation is $\lambda/2$. In order to achieve antenna element pattern with beam width of the desired 65 degrees, the antenna separation could be increased, With antenna separation of e.g. about $0.8\lambda$, the beam width of 65 degrees of the antenna element patterns could be obtained. However, when increasing the antenna separation above $\lambda/2$ another difficulty arises in that large gating lobes will occur when pre-coding beam are used that is steered out from broadside.

Figure 1:
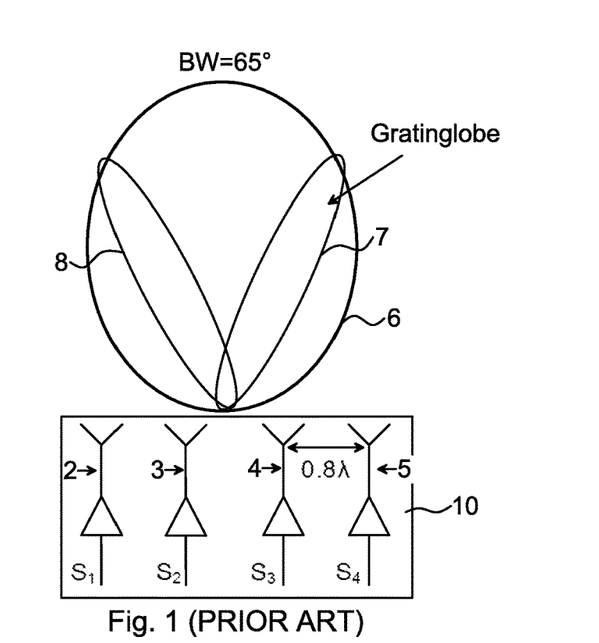
FIGS. 1 and 2 illustrate short-comings of prior art.
Figure 2:
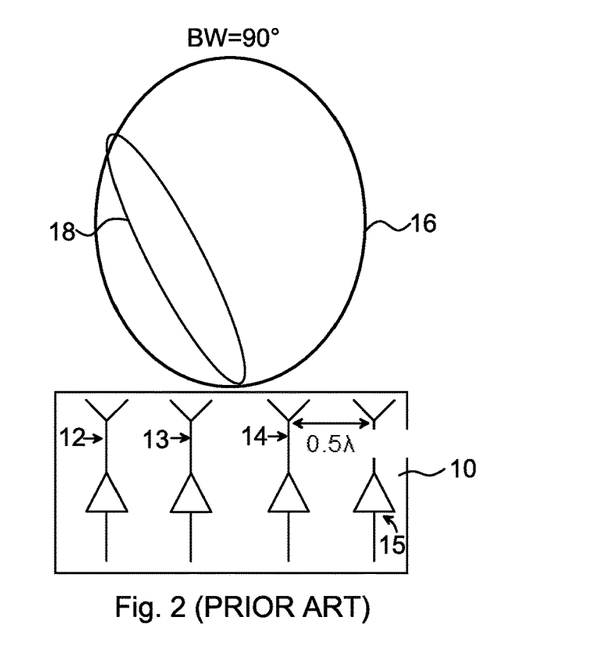

The above situations of different antenna separations and corresponding beam widths are illustrated in FIGS. 1 and 2 for the three sector base station. In particular, FIG. 1 illustrates an antenna configuration 1 of a three sector base station. That is, the base station is located in a cell of the communication system the coverage of which is divided into three sectors. The antenna configuration 1 comprises 4 active antenna elements 2, 3, 4, 5 having the antenna separation of $0.8\lambda$. The antenna separation of $0.8\lambda$ and the beam width of the antenna element pattern are designed to be 65 degrees, the 65 degrees antenna element pattern being indicated at reference numeral 6. As mentioned above, with this antenna separation grating lobes 7 will occur when pre-coding beams 8 are steered away from broadside. This will increase the interference towards other cells and reduce the efficiency of the base station since power is transmitted in undesired directions.

FIG. 2 illustrates another antenna configuration 10 of the three sector base station. Here, the antenna configuration 10 again comprises 4 active antenna elements 12, 13, 14, 15 but now having the antenna separation of $0.5\lambda$. This efficiently eliminates grating lobes when pre-coding. However, it is difficult to achieve an antenna design with a beam width, indicated at reference numeral 16, of less than 90 degrees for the antenna element pattern. In the typical three sector base station this results in high level of interference from one sector towards the other sectors of the cell.

The desire to obtain the beam width of 65 degrees is thus in conflict with the desire to use an antenna separation of about $\lambda/2$, both desires stemming from an effort to optimize the performance of the communication system. The above example illustrates the difficulties of simultaneously adapt different parameters, namely the beam width and the antenna spacing, to provide the best possible performance of the communication system.

SUMMARY OF THE INVENTION

It is an object of the present invention to overcome or at least alleviate the above-mentioned short-comings, by providing arrangements and methods that enable control of antenna element patterns so as to provide a desired beam width and antenna separation.

The object is in accordance with a first aspect of the invention achieved by an active antenna arrangement for transmitting precoded signals in a communication system that supports multi-stream beam-forming. The active antenna arrangement comprises three or more active antenna devices each comprising an antenna element and a power amplifier; at least a first and a second splitter, each arranged to split a respective one of the precoded signals into two or more split precoded signals; and at least one combiner arranged to: receive one of the two or more split precoded signals from the first splitter, and one of the two or more split precoded signals from the second splitter, and to combine the received split precoded signals for transmission by a single one of the active antenna devices.

By connecting the antenna elements e.g. two and two, a desired beam width for antenna element diagrams is enabled while simultaneously enabling a desired antenna separation. An optimal beam width can thereby be provided without undesired grating lobes. The performance of the communication system is increased for downlink transmission as more of transmitted power will end up at a desired location, i.e. at a user equipment.

In one embodiment, the first and second splitters each comprises a microstrip line comprising a first end to which one of the precoded signals is applied and an opposite end being divided into two or more parts, each part taking a predetermined amount of power of the applied precoded signal. A simple and readily implemented splitter is thus provided, which can easily be adapted in accordance with need, e.g. in view of desired antenna element patterns.

In a variation of the above embodiment, the opposite end of the microstrip line is divided into two parts, and designed so that the predetermined amount of power for a first of the two parts lies within the range of 40 to 60% of the power of the applied precoded signal. The microstrip line is for example designed so that an end of the microstrip line that is connected to the combiner receives a larger part of the power, e.g. 60% of the power.

In one embodiment, the opposite end of the microstrip line is divided into three parts, and designed so that the predetermined amount of power is split so that a part connected to the at least one combiner takes a larger part of the power of the applied precoded signal than a part not connected to the at least one combiner.

In one embodiment, the active antenna arrangement comprises a third splitter and each of the first, second and third splitters comprise a three-way splitter.

In a variation of the above embodiment, the combiner is operatively coupled to the first, the second and the third splitter so as to receive one of the three split precoded signals from the first splitter, one of the three split precoded signals from the second splitter and one of the three split precoded signals from the third splitter.

In one embodiment, consecutive antenna elements are arranged with a spacing in the range from 0.4 wavelengths to 0.6 wavelengths. An often desired antenna spacing is 0.5 wavelengths.

In one embodiment, the active antenna arrangement further comprises an antenna device arranged to transmit one of the two or more split precoded signals from the first splitter, or one of the two or more split precoded signals from the second splitter. In the basic embodiment, only one combiner, two splitters and three antenna elements are needed, and the outermost antenna elements transmit their respective split precoded signal, while the antenna element in the middle transmits split precoded signals from the first and second splitters.

The object is in accordance with a second aspect of the invention achieved by a method in a base station for transmitting precoded signals in a communication system that supports multi-stream beam-forming. The base station comprises three or more active antenna devices, each comprising an antenna element and a power amplifier. The method comprises: applying a respective precoded signal to at least a first and a second splitter; splitting, by each of the first and second splitter, a respective one of the applied precoded signals into two or more split precoded signals; receiving, in a combiner, one of the two or more split precoded signals from the first splitter, and one of the two or more split precoded signals from the second splitter; and transmitting, by a single one of the active antenna devices the received split precoded signals.

The object is in accordance with a third aspect of the invention achieved by a computer program for a base station for transmitting precoded signals in a communication system that supports multi-stream beam-forming. The base station comprises three or ore active antenna devices, each comprising an antenna element and a power amplifier. The computer program comprises computer program code which, when run on a processor of the base station, causes the base station: to apply a respective precoded signal to a first and a second splitter; to split, by each of the first and second splitter, a respective one of the applied precoded signals into two or more split precoded signals; to receive, in a combiner, one of the two or more split precoded signals from the first splitter, and one of the two or more split precoded signals from the second splitter; and to transmit, by a single one of the active antenna devices the received split precoded signals.

In one embodiment, a computer program product is provided comprising the computer program and a computer readable means on which the computer program is stored.

Further features and advantages thereof will become clear upon reading the following description and the accompanying drawings.

DETAILED DESCRIPTION OF EMBODIMENTS OF THE INVENTION

Future wireless systems will most likely use active antennas at the base station. An active antenna is an antenna that has an amplifier built into it. This allows the amplifier to be extremely close to the antenna, which minimizes transmission line losses.

The invention provides an arrangement for pre-coding, and some background of pre-coding is therefore briefly described in the following. In a multiple-input multiple-output (MIMO) system a transmitting device and a receiving device use multiple antennas, thereby improving the data transmission rate. Precoding is used to improve the communication system capacity, exploiting spatial diversity by simultaneously sharing spatial channel with multiple users. The transmitter may use channel state information, often obtained from the user equipment, for processing the signals. The MIMO transmitter, e.g. antennas of a base station, transmits a signal using multiple antennas by demultiplexing the signals into multiple sub-signals and transmitting the sub-signals from separate antennas.

With reference again to FIG. 1, multiple such sub-signals are illustrated. The multiple precoded signals $S_1$, $S_2$, $S_3$, $S_4$ are transmitted from the antenna elements 2, 3, 4 and 5, respectively.

Briefly, in contrast to the above and in accordance with the present invention, a precoded signal $S_1$ is split and transmitted by means of two or more antenna elements.

Figure 3:
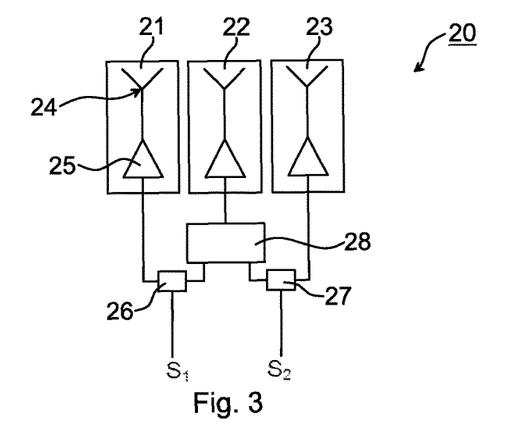
FIG. 3 illustrates a first embodiment of the antenna Arrangement.

FIG. 3 illustrates an embodiment of an antenna arrangement showing a basic concept of the present invention. The antenna arrangement 20 comprises, in this embodiment, three active antenna devices 21, 22, 23. Each active antenna device 21, 22, 23 comprises an antenna element 24 and a power amplifier 25. The antenna element 24 may for example be a dipole antenna.

The antenna arrangement 20 further comprises a first splitter 26 and a second splitter 27. Each splitter is arranged to split one of the precoded signals $S_1$, $S_2$ into two or more split precoded signals.

The first and second splitter 26, 27 may each comprise two-way splitter. Such two-way splitter may be implemented as a microstrip line, designed so as to split a precoded signal into split precoded signals in a desired manner. The splitter may for example be a microstrip line, one end of which is divided into two parts. One of the parts then convey part of the power of the precoded signal applied to the splitter, and the other part convey the remaining part of the power. For instance, one of the two parts may be designed to convey 40% of the power and the other to convey 60% of the power of the applied precoded signal.

In another embodiment, the splitter is a three-way splitter. When implemented as a microstrip line, one end of the microstrip line is divided into three parts, and as in the above embodiment, designed suitably so that a predetermined amount of power is split among the three parts as desired.

The antenna arrangement 20 further comprises a combiner 28. The combiner 28 is arranged to receive one of the two split precoded signals from the first splitter 26, and one of the two split precoded signals from the second splitter 27. The combiner 28 is arranged to these both received split precoded signals for transmission by a single one of the active antenna devices, namely the active antenna device 22.

The first splitter 26 is operatively connected to a signal processing unit (not disclosed) providing a precoded signal. The first splitter 26 is further operatively connected to the first active antenna element 21 and to the combiner 28. Correspondingly, the second splitter 27 is operatively connected to the signal processing unit providing a precoded signal. The second splitter 27 is further operatively connected to the third active antenna element 23 and to the combiner 28.

The combiner 28 is operatively connected to the second antenna element 22.

The first active antenna element 21 thus transmits part of the precoded signal $S_1$, the second active antenna element 22 transmits part of the precoded signal $S_1$ and part of the precoded signal $S_2$ as combined by the combiner 28, and the third active antenna element 23 transmits part of the precoded signal $S_2$.

Figure 4:
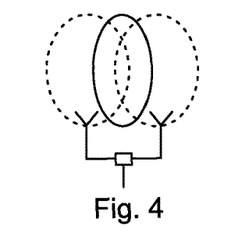
FIG. 4 illustrates antenna element diagrams of the embodiment of FIG. 3.

The active antenna devices are thus connected two and two in this embodiment. FIG. 4 illustrates schematically two such connected active antenna devices. The dashed circles indicate the antenna element pattern that each antenna would give if used as a single antenna. The continuous line illustrates schematically the antenna element pattern resulting when the active antenna devices are connected two and two. The antenna arrangement 20 thus overcomes the described short-comings of the prior art and is able to provide e.g. 65 degree beam width at the same time as the distance between the active antenna elements is half a wavelength.

Figure 5:
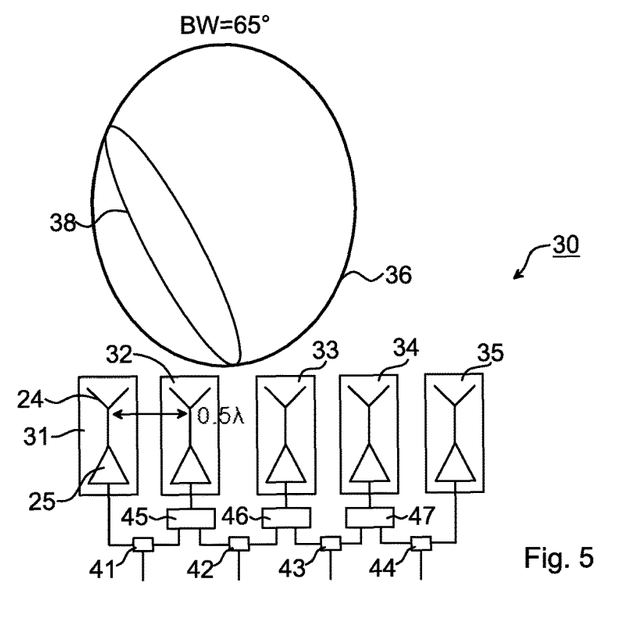
FIG. 5 illustrates a second embodiment of the antenna arrangement and antenna element diagram.

FIG. 5 illustrates another embodiment of the active antenna arrangement 30, comprising several active antenna devices 31, 32, 33, 34, 35, and in particular five such active antenna devices. As in the previous embodiment, each of the active antenna devices 31, 32, 33, 34, 35 comprises a power amplifier 25 and an antenna element. The active antenna arrangement 30 comprises three combiners 45, 46, 47 and four splitters 41, 42, 43, 44. The devices of this embodiment are connected in a manner analogous to the connections described for the first embodiment, and will not be described further in detail. As in the above embodiment, the active antenna elements are connected in pairs. It is realized that the number of active antenna devices, splitters and combiners may be varied and e.g. be adapted in accordance with requirements of the communication system.

The active antenna arrangement 30 is able to provide a beam width 36 of e.g. 65 degrees and an antenna separation of half a wavelength $\lambda/2$, without introducing any grating lobes when precoding.

Figure 6:
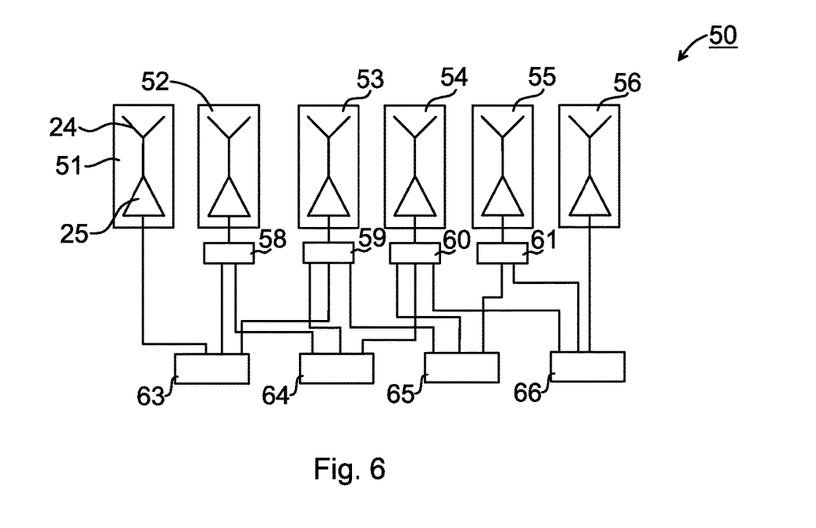
FIG. 6 illustrates a third embodiment of the antenna arrangement.

In a third embodiment, illustrated in FIG. 6, the active antenna arrangement 50 comprises splitters that are arranged to split a precoded signal into three parts. In the illustrated example, the active antenna arrangement 50 comprises four such three-way splitters 63, 64, 65, 66, six active antenna devices 51, 52, 53, 54, 55, 56 and four combiners 58, 59, 60, 61. The first splitter 63 receives a precoded signal and splits it into three split precoded signals, providing these to the first, the second and the third combiner 57, 58, 59. One precoded signal is then transmitted by three active antenna elements 51, 52, 53.

Thus, the second combiner 58 is operatively connected to the first, the second and the third splitter 63, 64, 65 so as to receive one of the three split precoded signals from the first splitter 63, one of the three split precoded signals from the second splitter 64 and one of the three split precoded signals from the third splitter 65. The other combiners are connected in a corresponding manner.

The splitters, combiners and active antenna elements are connected in a manner corresponding to the above embodiments. From the above, it should be clear to the skilled person how to arrange and connect the various devices.

The desired beam width is dependent on the number of sectors of the cell. In the cell having three sectors, a beam width of 65 degrees is typically desired, as discussed above. In a cell having a larger number of sectors a smaller beam width would typically be desired. For example, in a cell having six sectors, a beam width of about 35 degrees would be desired in order to optimize the performance of the communication system, and while maintaining a desired antenna spacing. For accomplishing such small beam widths, e.g. three active antenna elements should be combined, as in the embodiment of FIG. 6. The number of the various devices should thus be adapted in accordance with need.

In the various embodiments above, consecutive antenna elements 24 can be arranged with a desired spacing, for example lying within the range from 0.4 wavelengths to 0.6 wavelengths, e.g. arranged 0.5 wavelengths apart.

Figure 7:
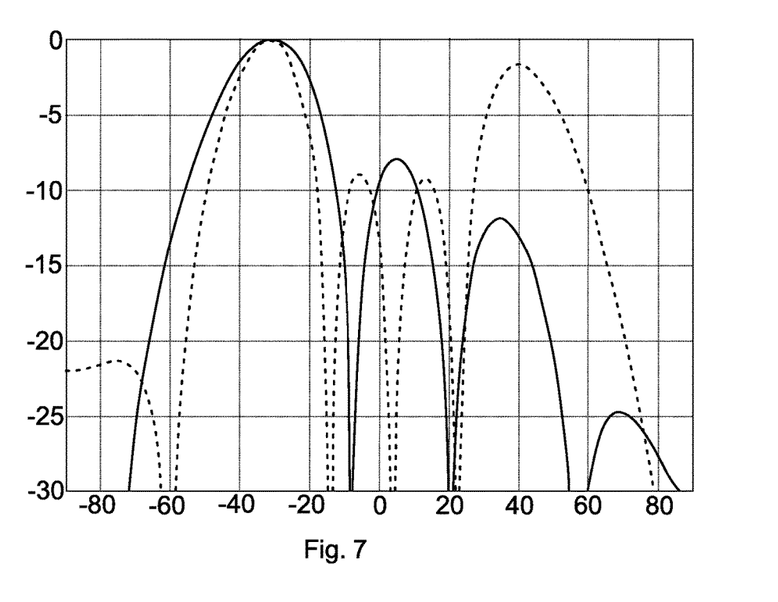
FIG. 7 illustrates a first simulation of radiation patterns.

FIG. 7 illustrates a first simulation of radiation patterns. In particular, the simulated radiation patterns when a precoding beam is steered out 30 degrees from broadside for the prior art arrangement of FIG. 1 and for the embodiment of FIG. 3, respectively. The beam width for the antenna element diagram for each port for the prior art arrangement of FIG. 1 as well as the embodiment of FIG. 3 are about 70 degrees. The thinner dashed line is the simulation result for the arrangement of FIG. 1, while the thicker continuous line is the simulation results for the embodiment of FIG. 3. As can be seen, the beam width of the main beam of the dashed line is smaller than the beam width of the beam of the continuous line, but the dashed line also have a big undesired grating lobe, which the continuous line does not have. The simulation results thus show that the invention reduces or even eliminates grating lobes.

Figure 8:
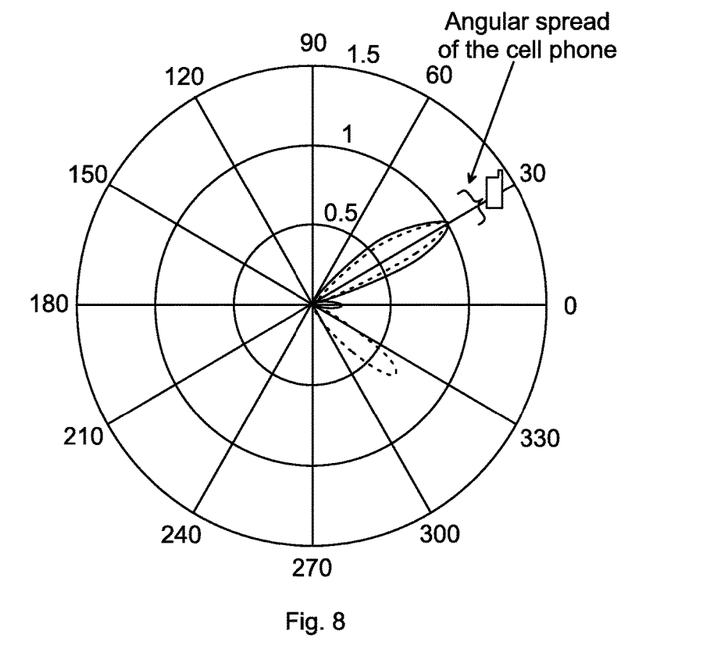
FIG. 8 illustrates the radiation patterns of FIG. 7 in another power scale.

FIG. 8 illustrates the same radiation patterns as shown in FIG. 7 but wherein the power scale is linear instead of in dB as in FIG. 8. A user equipment 80 is placed in the direction of the precoding beam 81 and an angular spread of the user equipment 80 is shown. The angular spread of the user equipment 80 means the angular spread of transmission rays hitting the user equipment 80 and emanating from a base station comprising the active antenna arrangement 20, 30, 50. in the illustrated case, the angular spread of the user equipment 80 is larger than the beam width of the precoding beams, which means that transmission rays from the whole main beams will reach the user equipment 80. Thus, all or almost all the transmitted power will reach the user equipment 80, which is in contrast to the prior art as illustrated in FIGS. 1 and 2, wherein almost half or even more of the transmitted power will be in the grating lobe 7.

Figure 9:
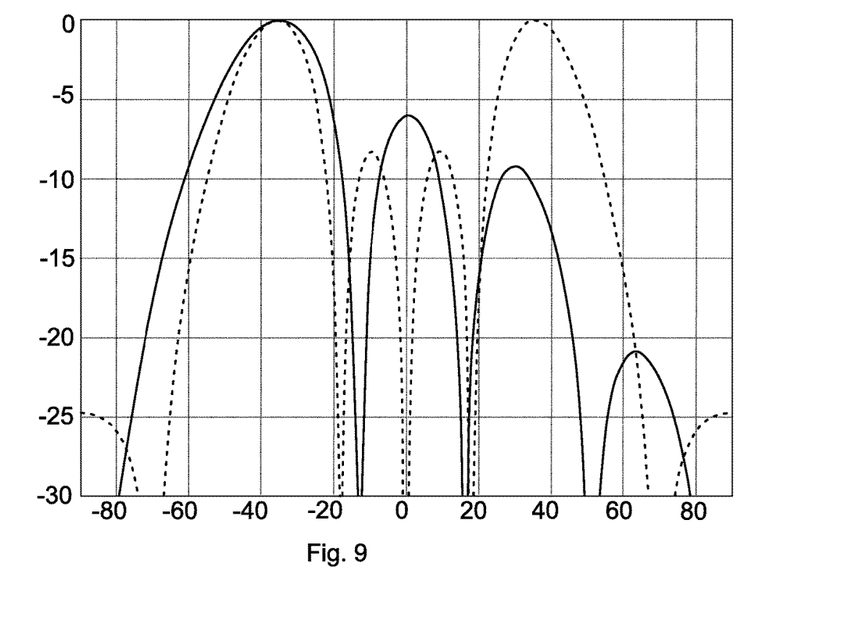
FIG. 9 illustrates a second simulation of radiation patterns.

FIG. 9 illustrates a second simulation of radiation patterns. The precoding beams have here been steered 35 degrees out from broadside instead of 30 degrees. In this figure it is evident that the problem of grating lobes of the prior art becomes even more pronounced.

Figure 10:
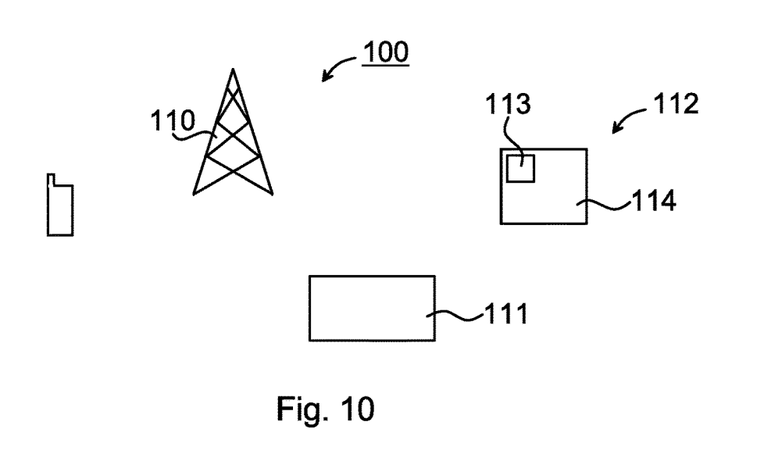
FIG. 10 illustrates a communication system in which the present invention may be implemented.

With reference to FIG. 10, the invention also encompasses a base station 110 for a communication system 100. The communication system 100 may for example be a system conforming to the Long Term Evolution (LTE) standard, and further comprises user equipment 115 able to communication therein. Any other communication system standard in which precoded signals are or may be utilized may also benefit from the present invention. The base station 110 comprises the active antenna arrangement 20, 30, 50 as described above.

It is noted that the precoding that is performed in or for the base station 110 can be linear or non-linear.

Figure 11:
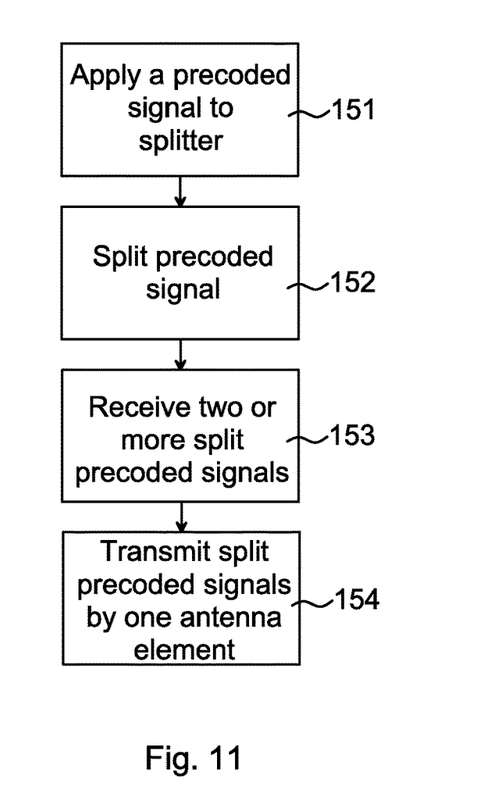
FIG. 11 illustrates a flow chart over steps of a method in accordance with the invention.

With reference to FIG. 11, the invention also encompasses a method 150 performed in the base station 110, for example performed by a processor 111 in the base station 110. Such processor 111 is schematically illustrated in the figure. In the LTE communication system comprising eNodeB (evolved Node B), the processing may be done in the base station. In other communication systems, the processing could be done elsewhere in the communication system, for example in a base station transceiver (BST), The base station 110 comprises three or more active antenna devices 21, 22, 23; 31, 32, 33, 34, 35; 51, 52, 53, 54, 55, 56, each comprising an antenna element 24 and a power amplifier 2. The method 150 comprises a first step of applying 151 a respective precoded signal to at least a first and a second splitter 26, 27; 41, 42, 43, 44; 63, 64, 65, 66.

The method 150 comprises a second step of splitting 152, by each of the first and second splitter, a respective one of the applied precoded signals into two or more split precoded signals.

The method 150 comprises a third step of receiving 153, in the combiner 28; 45, 46, 47; 57, 58, 59, 60, 61, 62, one of the two or more split precoded signals from the first splitter, and one of the two or more split precoded signals from the second splitter.

The method 150 comprises a fourth step of transmitting, by a single one of the active antenna devices (the received split precoded signals.

With reference again, to FIG. 10, the invention also encompasses a computer program 113 for the base station 110. The computer program 113 comprises computer program code which, when run on a processor 111 in the base station 110, causes the base station 110 to: apply a respective precoded signal to a first and a second splitter 26, 27; 41, 42, 43, 44; 63, 64, 65, 66; split, by each of the first and second splitter 26, 27, a respective one of the applied precoded signals into two or more split precoded signals; receive, in the combiner 28; 45, 46, 47; 57, 58, 59, 60, 61, 62, one of the two or more split precoded signals from the first splitter, and one of the two or more split precoded signals from the second splitter; and transmit, by a single one of the active antenna devices 21, 22, 23; 31, 32, 33, 34, 35; 51, 52, 53, 54, 55, 56 the received split precoded signals.

In an embodiment, a computer program product 112 is provided comprising the above-described computer program 113 a computer readable medium 114 on which the computer program 113 is stored.

The processor 111 may not only be a single CPU (central processing unit), but could comprise two or more processing units in the base station 110. For example, the processor 111 may comprise general purpose microprocessors, instruction set processors and/or related chips sets and/or special purpose microprocessors, such as ASICs (application specific integrated circuits). The processor 111 may also comprise board memory for caching purposes. The computer program 113 may be carried by a computer program product 112 in the base station 110 connected to the processor 111. The computer program product 112 comprises a computer readable medium on which the computer program 113 is stored. For example, the computer program product 1112 may be a flash memory, a RAM (Random-access memory), ROM (Read-Only memory) or an EEPROM (Electrically Erasable Programmable ROM), and the computer program modules described above could in alternative embodiments be distributed on different computer program products in the form of memories within the base station 110. The computer program product 113 may an optical disc, such as a CD (compact disc) a DVD (digital versatile disc) or a Blu-Ray disc.

The invention claimed is:

1. An active antenna arrangement for transmitting precoded signals in a communication system supporting multi-stream beam-forming, the active antenna arrangement comprising:
    a first active antenna device;
    a second active antenna device;
    a third active antenna device, wherein each active antenna device comprises an antenna element and a power amplifier,
    a first splitter directly connected to the first active antenna device, said first splitter configured to split a first precoded signal into two or more split precoded signals;
    a second splitter directly connected to the third active antenna device, said second splitter configured to split a second precoded signal into two or more split precoded signals; and
    a first combiner directly connected to the second active antenna device, said first combiner configured to:
        receive one of the two or more split precoded signals from the first splitter, and one of the two or more split precoded signals from the second splitter, and
        combine the received split precoded signals for transmission by the second active antenna device.

2. The active antenna arrangement as claimed in claim 1, wherein the first and second splitters each comprises a microstrip line comprising a first end to which one of the precoded signals is applied and an opposite end being divided into two or more parts, each part taking a predetermined amount of power of the applied precoded signal.

3. The active antenna arrangement as claimed in claim 2, wherein the opposite end of the microstrip line is divided into two parts, and designed so that the predetermined amount of power for a first of the two parts lies within the range of 40 to 60% of the power of the applied precoded signal.

4. The active antenna arrangement as claimed in claim 2, further comprising:
    a third splitter directly connected to a fourth active antenna device;

a fourth splitter directly connected to a fifth active antenna device, wherein each splitter comprises a microstrip line comprising a first end to which one of the precoded signals is applied and an opposite end being divided into three parts, each of the divided three parts taking a predetermined amount of power of the applied precoded signal, and wherein each splitter is configured to split the respective precoded signal into three split precoded signals;

a second combiner directly connected to the third active antenna device, the first splitter, the second splitter, and the third splitter;

a third combiner directly connected to the fourth active antenna device, the second splitter, the third splitter, and the fourth splitter; and a fourth combiner directly connected to the fifth active antenna device, the third splitter and the fourth splitter, wherein the second combiner is configured to:
 receive one of the three split precoded signals from the first splitter, one of the three split precoded signals from the second splitter, and one of the three split precoded signals from the third splitter, and
 combine the received split precoded signals for transmission by the third active antenna device, wherein the third combiner is configured to:
 receive one of the three split precoded signals from the second splitter, one of the three split precoded signals from the third splitter, and one of the three split precoded signals from the fourth splitter, and
 combine the received split precoded signals for transmission by the fourth active antenna device, and wherein the fourth combiner is configured to:
 receive one of the three split precoded signals from the third splitter, and one of the three split precoded signals from the fourth splitter, and
 combine the received split precoded signals for transmission by the fifth active antenna device.

5. The active antenna arrangement as claimed in claim 1, wherein consecutive antenna elements are arranged with a spacing in the range from 0.4 wavelengths to 0.6 wavelengths.

6. A base station for transmitting precoded signals in a communication system supporting multi-stream beam-forming, the base station comprising an active antenna arrangement as claimed in claim 1.

7. A method in a base station for transmitting precoded signals in a communication system supporting multi-stream beam-forming, the base station comprising an active antenna arrangement comprising:
 a first active antenna device;
 a second active antenna device;
 a third active antenna device, wherein each active antenna device comprises an antenna element and a power amplifier;
 a first splitter directly connected to the first active antenna device, said first splitter configured to split a first precoded signal into two or more split precoded signals;
 a second splitter directly connected to the third active antenna device, said second splitter configured to split a second precoded signal into two or more split precoded signals; and a first combiner directly connected to the second active antenna device, said first combiner configured to:
 receive one of the two or more split precoded signals from the first splitter, and one of the two or more split precoded signals from the second splitter, and
 combine the received split precoded signals for transmission by the second active antenna device, the method comprising:
applying the first precoded signal to the first splitter,
applying the second precoded signal to the second splitter,
splitting, by the first splitter, the applied first precoded signal into two or more split precoded signals,
splitting, by the second splitter, the applied second precoded signal into two or more split precoded signals,
receiving, in the first combiner, one of the two or more split precoded signals from the first splitter, and one of the two or more split precoded signals from the second splitter, and
transmitting, by the second active antenna device, the received split precoded signals.

8. A computer program for a base station for transmitting precoded signals in a communication system supporting multi-stream beam-forming, the base station comprising an active antenna arrangement comprising:
 a first active antenna device;
 a second active antenna device;
 a third active antenna device, wherein each active antenna device comprises an antenna element and a power amplifier;
 a first splitter directly connected to the first active antenna device, said first splitter configured to split a first precoded signal into two or more split precoded signals;
 a second splitter directly connected to the third active antenna device, said second splitter configured to split a second precoded signal into two or more split precoded signals; and
 a first combiner directly connected to the second active antenna device, said first combiner configured to:
 receive one of the two or more split precoded signals from the first splitter, and one of the two or more split precoded signals from the second splitter, and
 combine the received split precoded signals for transmission by the second active antenna device, the computer program comprising computer program code which, when run on a processor of the base station, causes the base station to:
apply the first precoded signal to the first splitter,
apply the second precoded signal to the second splitter,
split, by the first splitter, the applied first precoded signal into two or more split precoded signals,
split, by the second splitter, the applied second precoded signal into two or more split precoded signals,
receive, in the first combiner, one of the two or more split precoded signals from the first splitter, and one of the two or more split precoded signals from the second splitter, and
transmit, by the second active antenna device, the received split precoded signals.

9. A computer program product comprising a computer program according to claim 8, and a computer readable medium on which the computer program is stored.

* * * * *